United States Patent

[11] 3,555,344

| [72] | Inventor | Loyd C. Moore |
| | | Riverside, Calif. |
| [21] | Appl. No. | 711,468 |
| [22] | Filed | Mar. 6, 1968 |
| [45] | Patented | Jan. 12, 1971 |
| [73] | Assignee | The United States of America as represented by the Secretary of the Navy |

[54] IMAGE DISSECTOR FOR COUNTERACTING MAGNIFICATION DUE TO RANGE CLOSURE
5 Claims, 3 Drawing Figs.

[52] U.S. Cl.................................................. 315/11,
313/67, 313/74, 313/82, 313/85, 313/86
[51] Int. Cl...................................................... H01j 31/48
[50] Field of Search........................................ 250/207,
203, 213; 313/82, 85, 86, 74, 66, 67, 68; 315/10, 11, 12

[56] References Cited
UNITED STATES PATENTS

| 3,201,630 | 8/1965 | Orthuber et al. | 313/67X |
| 3,289,030 | 11/1966 | Hergenrother | 313/86X |
| 3,333,145 | 7/1967 | Nielsen | 315/10 |
| 3,355,616 | 11/1967 | Hecker et al. | 313/85X |

*Primary Examiner*—Rodney D. Bennett, Jr.
*Assistant Examiner*—Joseph G. Baxter
*Attorneys*—G. J. Rubens and J. M. St. Amand

ABSTRACT: An image dissector tube having an aperture plate for forming an electronic scanning slit and for counteracting the magnification or growth effect of an object in the scene image due to range closure.

LOYD C. MOORE
INVENTOR.

BY *J. M. St. Amand*

ATTORNEY

IMAGE DISSECTOR FOR COUNTERACTING MAGNIFICATION DUE TO RANGE CLOSURE

The invention herein described may be manufactured and used by or for the Government of the United States of America for governmental purposes without the payment of any royalties thereon or therefor.

This invention relates to television imaging tubes and more particularly to image dissector tubes.

Existing image dissectors usually have a single aperture at the center of the aperture plate and the electron image of the scene is deflected across the aperture plate; the output from the tube is then derived from the electrons that pass through the aperture. With only a single aperture only one output is available and the effective resolution of the tube is fixed and is determined by the size of the aperture.

The image dissector of the present invention provides a means for obtaining a number of separate outputs, each giving a different resolution. The aperture plate of the image dissector tube is comprised of multiple apertures of different sizes arranged in a straight line with the smallest aperture at the center of the plate and each adjacent aperture extending towards the edge of the plate being progressively larger. By combining the output from several of the apertures and rotating the scene image about the connected apertures an effective "slit" can be formed. Also, as the objects within the scene image become larger due to range closure, the outputs from additional apertures can be summed to maintain the same ratio of aperture area to object size in the image scene.

Many of the attendant advantages of this invention will become readily appreciated as the same becomes better understood by reference to the following detailed description when considered in connection with the accompanying drawings wherein.

Figure 1:
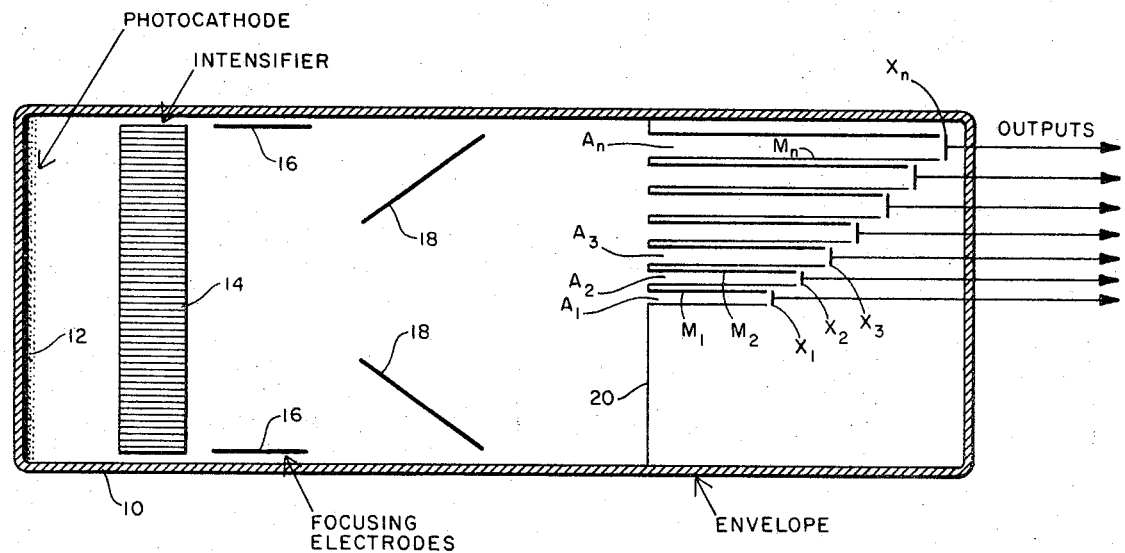
FIG. 1 is a diagrammatic side illustration of an image dissecting tube embodying the present invention.

FIG. 1, showing one possible form of the invention, consists of an evacuated envelope 10, of glass or the like, having mounted at one end thereof a photocathode 12 that emits electrons from each small element of area in proportion to the number of photons impinging upon that area. An image intensifier 14 is positioned following photocathode 12 and multiplies the number of electrons emitted from the photocathode. An electrostatic electron image focusing electrode 16 projects the electron image from the photocathode and image intensifier through an electrostatic deflection system 18 to the readout apertures $A_1$, $A_2$, $A_3$, ... $A_n$ in plate 20. The electrons that pass through apertures are again multiplied by electron multipliers $M_1$, $M_2$, $M_3$, ... $M_n$; and are collected on anodes $X_1$, $X_2$, $X_3$ ... $X_n$.

A pattern of light applied to photocathode 12 is converted into a corresponding distribution of electrons by photoelectric emission. This electron image is enhanced in electron density by passing each portion of the image, for example through a tubular channel of a channel type intensifier 14. The signal is then projected, i.e., accelerated through the focusing field of focusing electrodes 16 upon plate 20 containing the readout apertures. The portion of the image sampled by the apertures is changed by moving the focused image across the aperture. The energy derived from the electron beam is further increased in the electron multipliers and then applied to an output video circuit via anodes $X_1$, $X_2$, $X_3$ ... $X_n$.

Photocathode 12 is a conventional photoemissive surface. Image intensifier 14 is a well-known channel intensifier, although of comparatively recent development, that uses secondary emission to increase the electron number by accelerating them into a number of small tubular channels. When the electrons impinge upon the channel walls, the energy is sufficient to cause a number of electrons to be released for each initial impinging electron.

The scanned imaging tube can both be focused and deflected magnetically, by well-known means, instead of electrostatically by focusing system 16 and deflection system 18; or either one of these two functions could be performed magnetically.

Photocathode 12 can be such that it is sensitive in the ultraviolet, visible, and/or in the infrared region of the electromagnetic radiation spectrum to suit the desired use for the tube.

Also, intensifier 14 can be a channel multiplier, cascaded thin transmission films, cascaded phosphor-photocathode sandwich, or one of a number of other suitable types of intensifiers. The overall photon-electron gain can be low, medium or high enough so that the sensitivity of the overall tube is limited only by photocathode noise or the quantum fluctuation of the incident light photons.

The electron deflection system 18 can be connected to any appropriate raster deflection generator such as a TV raster, circular scan or crosshair deflection generator.

Figure 2:
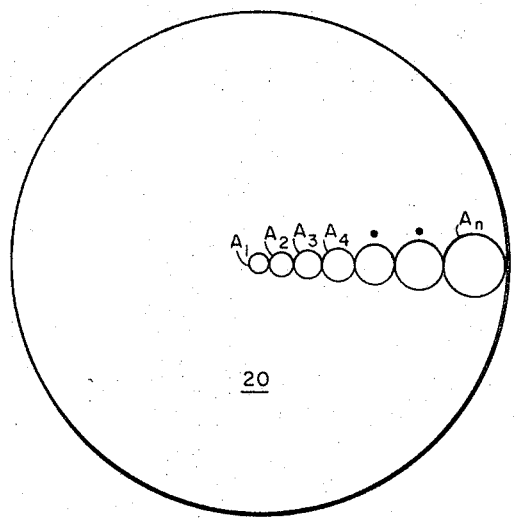
FIG. 2 shows a front view embodiment of the varying multiple aperture plate used in the image dissector of FIG. 1.

As shown in FIG. 2, the aperture plate 20 contains a number of apertures ($A_1$, $A_2$, $A_3$, ... $A_n$) arranged in a straight line from the center of the aperture plate to the edge. The aperture $A_1$ at the center of plate 20 is the smallest in area and its individual output represents the highest resolution obtainable. Each adjacent aperture from the center towards the outer edge of the plate is progressively larger in area and individually represents lower resolution. By summing the output from two or more of the adjacent apertures an effective "slit" can be formed. This can be used in trackers which now use a mechanical slit. Instead of the mechanical slit, the output from the apertures $A_1$, $A_1$, and $A_3$ for example, or more as needed would be summed. As the scene is rotated about an axis perpendicular to aperture plate 20 and passing through the smallest aperture $A_1$, the summed output forms an electronically scanned slit. As the range between a tracker and the scene is reduced and the objects within the scene image become larger, the next adjacent aperture $A_4$ can be summed with the first three (i.e., $A_1$, $A_2$, and $A_3$) to maintain the same ratio between aperture or "slit" size and object image size within the scene. In this manner the summation of additional aperture outputs as the range between the tracker and scene is reduced counteracts the magnification of objects within the scene.

Each of the multiple apertures ($A_1$, $A_2$, $A_3$...$A_n$) are formed by a respective microchannel electron multiplier $M_1$, $M_2$, $M_3$...$M_n$. The multiple aperture plate with microchannel electron multipliers serving as the aperture outputs permits not only the small size required for each of the aperture outputs but also provides additional gain.

Another use is in a seeker which uses a single aperture dissector as the sensor and the scene is deflected across the aperture plate in such a manner to form a circular scan. The circular scan is placed inside the target image at lockon and expands automatically maintaining a fixed "duty" cycle or ratio of scan within the target to scan outside the target as the target image becomes larger due to range closure. At very low light levels the tracker can track adequately with a fixed size scan circle. However, due to the noise content in the signal the "duty" cycle cannot be detected sufficiently accurately to effectively control the scan growth, but the scan completely within the target area can be detected with some degree of confidence. In this case, by using the multiple aperture plate of this invention, as the target image enlarges due to range closure and the output from the center aperture $A_1$ scan falls completely within the target, the output may be switched to the adjacent aperture $A_2$ which should now fall both within and outside the target. When the output from this aperture scan falls completely within the target, the output is then switched to the next adjacent aperture $A_3$, etc. This arrangement effectively gives a scan growth capability in discrete steps. External circuitry can be used to counteract any squint introduced when switching from one aperture to the next.

Figure 3:
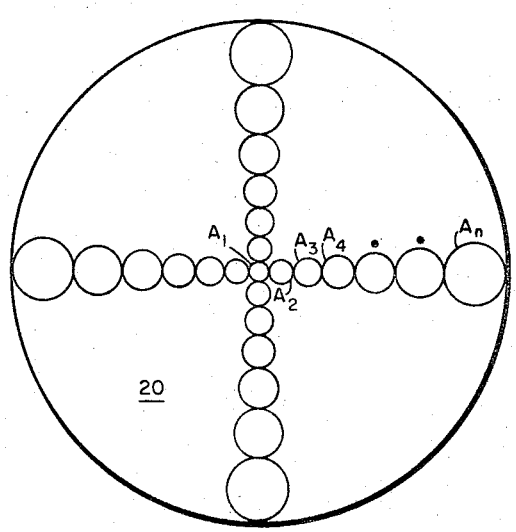
FIG. 3 shows another embodiment of the multiple aperture plate.

Alternatives to the above invention can take many forms, one of which is to have the same multiple aperture arrangement as shown in FIG. 2 with the addition of three other rows of apertures, making one row of apertures in each of the four quadrants of the aperture plate such as shown in FIG. 3. When used in a circular mode, the output from a single aperture in each of the rows can be correlated with the output from the corresponding aperture in each of the other three rows. Error information can then be obtained by integrating the output of each of the four rows (or individual apertures in each of the four rows) and correlating the output of the four integrators.

Obviously many modifications and variations of the present invention are possible in the light of the above teachings. It is therefore to be understood that within the scope of the appended claims the invention may be practiced otherwise than as specifically described.

I claim:

1. An image dissector tube for counteracting the effect of magnification of objects within the scene image, comprising:
   a. a tube housing having a transparent input end;
   b. a photocathode means at the input end of said tube for emitting an electron image of objects in a scene viewed at said tube input;
   c. readout means;
   d. focusing means for focusing the electron image emitted from said photocathode means and projecting the image upon said readout means;
   e. deflection means for moving the focused electron image about the surface of said readout means;
   f. said readout means comprising an aperture plate having a plurality of apertures extending from the center in progressively increasing magnitude to the outer edge of said aperture plate for sampling the electron image;
   g. an output anode for each aperture in said aperture plate to which is fed electron energy from respective apertures;
   h. respective microchannel electron multipliers provided for each aperture between respective apertures and output anodes to provide additional gain; and
   i. the size of said electron multipliers in both diameter and length being in proportion to their respective apertures.

2. A device as in claim 1 wherein said apertures extend in a single line from the center to the edge of said aperture plate.

3. A device as in claim 1 wherein an image intensifier means is positioned between said photocathode means and focusing means for multiplying the number of electrons emitted from the photocathode means.

4. A device as in claim 1 wherein the apertures extend in four separate rows of apertures extending from the center to the edge of said aperture plate with one row of apertures being in each quadrant of the aperture plate.

5. A device as in claim 1 wherein said deflection means is for rotating the electron image about an axis perpendicular to the center of said readout means.